(12) United States Patent
Nagwanshi et al.

(10) Patent No.: US 8,322,780 B2
(45) Date of Patent: Dec. 4, 2012

(54) REINFORCED BODY IN WHITE AND METHOD OF MAKING AND USING THE SAME

(75) Inventors: Dhanendra Kumar Nagwanshi, Bangalore (IN); Sudhakar Ramamoorthy Marur, Bangalore (IN); Matthew Douglas Marks, Waterford, MI (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/973,184

(22) Filed: Dec. 20, 2010

(65) Prior Publication Data

US 2012/0153669 A1 Jun. 21, 2012

(51) Int. Cl.
*B60N 99/00* (2006.01)

(52) U.S. Cl. .............. 296/187.03; 296/203.01

(58) Field of Classification Search .......... 293/132, 293/133, 135, 136; 296/187.03, 187.05, 296/187.08, 187.09, 187.1, 187.11, 187.12, 296/187.13, 190.05, 193.06, 193.07, 203.01, 296/203.04, 205
See application file for complete search history.

(56) References Cited

U.S. PATENT DOCUMENTS

| | | | | |
|---|---|---|---|---|
| 3,162,745 A | * | 12/1964 | Rohr | 219/83 |
| 3,842,944 A | * | 10/1974 | Shiotani et al. | 293/133 |
| 5,139,297 A | * | 8/1992 | Carpenter et al. | 293/132 |
| 5,480,729 A | * | 1/1996 | Hattori et al. | 428/593 |
| 5,618,074 A | | 4/1997 | Weast | |
| 5,819,408 A | * | 10/1998 | Catlin | 29/897.2 |
| 6,299,958 B1 | * | 10/2001 | St. Julien et al. | 428/73 |
| 6,394,512 B1 | | 5/2002 | Schuster et al. | |
| 6,467,822 B1 | | 10/2002 | Leng | |
| 6,494,510 B2 | | 12/2002 | Okamura et al. | |
| 6,503,585 B1 | | 1/2003 | Wagenblast et al. | |
| 6,513,843 B1 | | 2/2003 | Frederick et al. | |
| 6,540,275 B1 | | 4/2003 | Iwamoto et al. | |
| 6,685,243 B1 | | 2/2004 | Evans | |
| 6,866,331 B2 | | 3/2005 | Kropfeld | |
| 6,938,936 B2 | * | 9/2005 | Mooijman et al. | 293/120 |
| 7,044,514 B2 | | 5/2006 | Mustafa et al. | |
| 7,086,690 B2 | | 8/2006 | Shuler et al. | |
| 7,134,700 B2 | | 11/2006 | Evans | |
| 7,163,243 B2 | | 1/2007 | Evans | |
| 7,222,896 B2 | | 5/2007 | Evans | |
| 7,434,872 B2 | | 10/2008 | Steller | |

(Continued)

FOREIGN PATENT DOCUMENTS

DE 102007038087 A1 2/2009

(Continued)

OTHER PUBLICATIONS

European Patent No. 1369309 (A1); Publication Date: Dec. 10, 2003; English Machine Translation; 13 pages.

(Continued)

*Primary Examiner* — Lori Lyjak
(74) *Attorney, Agent, or Firm* — Cantor Colburn LLP (57) ABSTRACT

In various embodiments, a structural body of a vehicle comprises: a hollow metal component comprising walls that define a channel, wherein the metal vehicle component has a metal component length, and wherein the metal vehicle component is selected from the group consisting of beam, rail, pillar, chassis, floor rocker, and cross-bar, combinations comprising at least one of the foregoing; and a plastic reinforcement having a honeycomb structure, wherein the plastic reinforcement is located in the channel. The metal component can be a portion of the structural body of the vehicle.

22 Claims, 7 Drawing Sheets

U.S. PATENT DOCUMENTS

| | | |
|---|---|---|
| 7,517,006 B2 | 4/2009 | Kageyama et al. |
| 7,520,561 B2 | 4/2009 | Nakamae et al. |
| 7,597,383 B2 | 10/2009 | Itou et al. |
| 7,607,720 B2 | 10/2009 | Noyori et al. |
| 7,699,383 B2 | 4/2010 | Fukukawa et al. |
| 7,806,448 B2 | 10/2010 | Allen et al. |
| 7,879,435 B2 | 2/2011 | Mett et al. |
| 2001/0026072 A1 | 10/2001 | Sato et al. |
| 2002/0050413 A1 | 5/2002 | Renault |
| 2002/0125725 A1 | 9/2002 | Satou |
| 2002/0129981 A1 | 9/2002 | Satou |
| 2002/0180223 A1 | 12/2002 | Vismara et al. |
| 2003/0034658 A1 | 2/2003 | Cate et al. |
| 2003/0067179 A1 | 4/2003 | Bastien et al. |
| 2003/0164618 A1 | 9/2003 | Gentle |
| 2004/0051321 A1 | 3/2004 | Hanai et al. |
| 2004/0124643 A1 | 7/2004 | Matsumoto et al. |
| 2004/0174025 A1 | 9/2004 | Converse et al. |
| 2006/0119116 A1 | 6/2006 | Goertz |
| 2006/0181089 A1 | 8/2006 | Andre et al. |
| 2008/0048462 A1 | 2/2008 | Zabik |
| 2008/0246277 A1* | 10/2008 | Gallagher et al. ....... 285/148.13 |
| 2008/0286522 A1* | 11/2008 | Khan et al. .................... 428/116 |
| 2009/0160203 A1 | 6/2009 | Garg et al. |
| 2009/0309387 A1 | 12/2009 | Goral et al. |

FOREIGN PATENT DOCUMENTS

| | | | |
|---|---|---|---|
| EP | 1065108 | A2 | 1/2001 |
| EP | 1369309 | A1 | 12/2003 |
| EP | 1419936 | A1 | 5/2004 |
| EP | 1300293 | B1 | 12/2004 |
| EP | 1652733 | A1 | 5/2006 |
| EP | 1759959 | A2 | 3/2007 |
| FR | 1473197 | A1 | 11/2004 |
| FR | 2859970 | A1 | 3/2005 |
| FR | 2864811 | A1 | 7/2005 |
| FR | 2887508 | A1 | 12/2006 |
| GB | 2384217 | A | 7/2003 |
| JP | 09020267 | A | 1/1997 |
| JP | 2006247237 | A | 9/2006 |
| WO | 2005100100 | A1 | 10/2005 |
| WO | 2006065868 | A2 | 6/2006 |
| WO | 2006119225 | A2 | 11/2006 |
| WO | 2008016653 | A2 | 2/2008 |

OTHER PUBLICATIONS

European Patent No. 16527733A1; Publication Date: May 3, 2006; Abstract Only; 1 Page.

International Patent No. 2005/100100A1; Publication Date Oct. 27, 2005; Abstract Only; 1 Page.

International Patent No. 2006/136743A3; Publication Date Mar. 15, 2007; Abstract Only; 1 Page; Equivalent to French Patent No. 2887508A1.

Japanese Patent No. 2006247237 (A); Date of Publication: Sep. 21, 2006; Abstract Only; 1 Page.

French Patent No. 2859970A1; Publication Date Mar. 25, 2005; Abstract Only; 1 Page.

French Patent No. 2864811A1; Publication Date Jul. 8, 2005; Abstract Only; 1 Page.

European Patent No. 1759959 (A2); Publication Date: Mar. 7, 2007; Machine Translation; 18 Pages.

Japanese Patent No. 09020267 (A); Publication Date: Jan. 21, 1997; Abstract Only; 1 Page.

German Patent No. 102007038087 (A1); Publication Date: Feb. 12, 2009; Abstract Only; 1 Page.

European Patent No. 1473197 (A1); Publication Date: Nov. 3, 2004; Abstract Only; 1 Page.

European Patent No. 1759959 (A2); Publication Date: Mar. 7, 2007; Abstract Only; 1 Page.

International Search Report; International Application No. PCT/US2011/065798; International Filing Date: Dec. 19, 2011; Date of Mailing: Mar. 27, 2012; 5 Pages.

Written Opinion of the International Searching Authority; International Application No. PCT/US2011/065798; International Filing Date: Dec. 19, 2011; Date of Mailing: Mar. 27, 2012; 6 Pages.

U.S. Appl. No. 12/939,374, filed Nov. 4, 2010; "Energy Absorbing Device and Methods of Making and Using the Same".

* cited by examiner

REINFORCED BODY IN WHITE AND METHOD OF MAKING AND USING THE SAME

BACKGROUND

The present disclosure relates to the structural body of a vehicle and to weight reduction thereof.

Automotive manufacturers are continuing to reduce the weight of passenger cars to meet the increasing government regulations on fuel efficiency and reducing emissions. The structural body of a vehicle, commonly known as the body-in-white (BIW), is a vehicle's largest structure, and therefore ideal for weight reduction considerations. Body-in-white refers to the welded sheet metal components which form the vehicles structure to which the other components will be married, i.e., the engine, the chassis, the exterior and interior trim, the seats, etc. Reducing body weight, however, involves a trade-off with body stiffness, a key characteristic which influences vehicle dynamics, durability, and crash worthiness.

This generates the need to design a BIW having reduced weight, without sacrificing durability and crash worthiness.

BRIEF DESCRIPTION

Disclosed, in various embodiments are plastic reinforced structural elements of a vehicle body as well as methods of making the using the reinforced body.

In various embodiments, a structural body of a vehicle comprises: a hollow metal component comprising walls that define a channel, wherein the metal component has a metal component length, and wherein the metal component is selected from the group consisting of beam, rail, pillar, chassis, floor rocker, and cross-bar, combinations comprising at least one of the foregoing; and a plastic reinforcement having a honeycomb structure, wherein the plastic reinforcement is located in the channel. The metal component is a portion of the structural body of the vehicle.

In one embodiment, a vehicle comprises: structural body, an engine, and a drive mechanism. The structural body comprises: a hollow metal vehicle component comprising walls that define a channel, wherein the metal vehicle component has a metal vehicle component length, and wherein the metal vehicle component is selected from the group consisting of beam, rail, pillar, chassis, floor rocker, and cross-bar, combinations comprising at least one of the foregoing; and a plastic reinforcement having a honeycomb structure, wherein the plastic reinforcement is located in the channel.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

As mentioned above, it is desirable to reduce the weight of a vehicle without compromising structural integrity and durability. Therefore, it is desirable to reduce the amount of metal employed in the vehicle while not sacrificing strength. Employed throughout the vehicle are hollow metal structural elements (e.g., beams, rails, pillars, rockers, bars, and so forth). The wall thickness of these various elements is sufficient to impart the desired structural integrity to that element to meet its desired function and various regulatory requirements. It has been discovered that the thickness of the wall can be reduced, thereby reducing the weight of the component and hence the vehicle, while retaining the structural integrity of the element by using localized plastic reinforcement in the component. Disclosed herein, in various embodiments, is a plastic reinforced structural body of a vehicle, e.g., plastic reinforced hollow metal parts of a motor vehicle. The disclosed energy-absorbing device is a hybrid metal-plastic solution. The device is a deformable unit comprising a metal channel with plastic reinforcement (e.g., localized plastic reinforcement). Essentially, localized plastic honeycomb reinforcement can be used to provide structural integrity to the hollow metal component.

For high-speed front crash (e.g., a speed of greater than or equal to 29 kilometers per hour (kmph)), front portion of the vehicle chassis (e.g., bumper beam, energy absorber, and rails), absorbs maximum amount of impact energy. For high-speed side crashes B-pillar, floor rocker, and floor crossbars play key role in energy absorption. For rollover or roof-crush the A-pillar, B-pillar, and roof rails play key role in impact energy absorption. Generally above-mentioned components are hollow metal sections. To improve the crashworthiness of above-mentioned components of vehicle, a hybrid metal plastic solution, comprising channels with localized plastic reinforcement is disclosed herein. The disclosed crush countermeasure provides impact and/or reinforcement characteristics in a lighter weight structure as compared to prior systems composed entirely of metal. The crush countermeasure provides a lightweight crush system having comparable protection to current all metal systems. As such, the overall weight of a vehicle is reduced without any reduction in safety to passengers.

Disclosed are plastic reinforced structural components, which can be used to minimize damage suffered during an impact. The plastic (e.g., thermoplastic) reinforced structural components comprise a metal component surrounding a plastic reinforcement. The thermoplastic reinforcement can be located throughout the structural component, or in strategic locations within the structural component ("localized"). Elements of the structural body that can be reinforced include the beam(s), rail(s), pillar(s), chassis, floor rocker, and cross-bar (s), and other hollow metal components, as well as combinations comprising at least one of the foregoing The plastic reinforcement can have an alveolar structure more commonly referred to as "honeycomb" (e.g., an array of columns and channels). The combs of the structure can be any polygonal or rounded shape, such as circular, oval, square, rectangular, triangular, diamond, pentagonal, hexagonal, heptagonal, and octagonal geometries, as well as combinations comprising at least one of the foregoing geometries. Plastic honeycombs can be made by bonding extruded plastic tubes together, injection molding the plastic honeycombs, extruding the honeycomb structure, or otherwise formed. For example, the plastic reinforcement can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different plastic for particular combs, or a combination comprising at least one of the foregoing. One possible fill material is foam.

The honeycombs' orientation with respect to the channels can also be adjusted to tune the energy absorption characteristics of the reinforced structural component (e.g., BIW). For example, the honeycomb can form channels that can be oriented 0 degrees (e.g., parallel) to 90 degrees (perpendicular), to the channel walls. In other words, in some embodiments, the honeycombs can have a common main axis with the hollow channel and extend parallel thereto. In other embodiments, the honeycombs can extend perpendicular to the main axis of the hollow channel.

Figure 1:
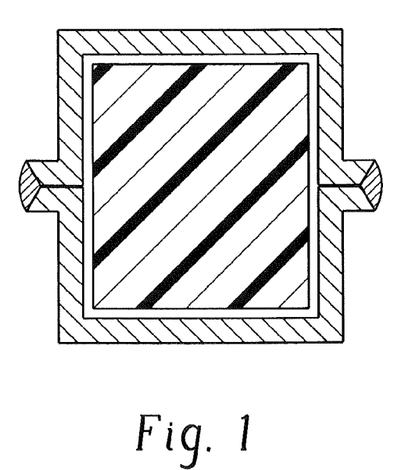
FIGS. 1-4 are cross-sectional views of different embodiments of a reinforced BIW component.

The structural component is a metal element having a hollow channel therein. The plastic reinforcement is disposed in the channel. When the plastic reinforcement is not located throughout the whole channel, it can be attached to the metal to inhibit the plastic reinforcement from being dislodged during use of the vehicle or during an impact. Attachment of the plastic reinforcement and the metal element can be achieved using various mechanisms including bonding agents (FIG. 3), welds (FIGS. 1 and 2), fixing measures (FIG. 4), as well as combinations comprising at least one of the foregoing.

Some possible metal component material(s) include aluminum, titanium, chrome, magnesium, zinc, and steel, as well as combinations comprising at least one of the foregoing materials. The thickness of the walls of the metal component can all be the same or can be different to enhance stiffness in a desired direction. For example, one set of opposing walls can have a greater/lesser thickness than the other set of opposing walls. In some embodiments, the metal components have a wall thickness of less than or equal to 1.6 mm, specifically, 1.0 mm to 1.5 mm, and more specifically 1.3 mm to 1.4 mm. Generally, metal walls (e.g., floor rocker, rails, pillars, bumper beam, and so forth), have a wall thickness of greater than 1.8 mm. Therefore, the use of the plastic reinforcement enables a reduction in wall thickness of greater than or equal to 10%, specifically, greater than or equal to 20%, and even greater than or equal to 25%.

The plastic reinforcement can comprise various plastic materials, e.g., thermoplastic, thermoset and combinations thereof. The particular material can be chosen based upon its properties, the desired location in the vehicle, and the characteristics of that location. For example, in some embodiments, the material can have moderate stiffness (e.g., Young's modulus of 0.8 gigaPascals (GPa) to 7.0 GPa), good elongation (e.g., greater than 30% elongation), chemical resistance and/or heat resistance under vehicle manufacturing conditions (e.g., welding, painting, etc., for example, at temperatures 400° F. for 30 minutes, which enables the plastic insert to maintain integrity as the part travels with the auto body through paint bake). Exemplary plastic materials include thermoplastic materials as well as combinations of thermoplastic materials with metal, elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the plastic component can comprise Xenoy® resin, which is commercially available from SABIC Innovative Plastics IP B.V. The plastic can optionally be reinforced, e.g., with fibers, particles, flakes, as well as combinations comprising at least one of the foregoing. For example, the plastic insert can be formed from STAMAX* materials, a long glass fiber reinforced polypropylene commercially available from SABIC Innovative Plastics IP B.V. The plastic component can also be made from combinations comprising at least one of any of the above-described materials and/or reinforcements, e.g., a combination with a thermoset material.

The overall size of the plastic reinforcement will be depending upon its location within the BIW and the size of the associate channel. Furthermore, the characteristics of the plastic reinforcement will depend upon the energy absorption characteristics desired in the particular area, e.g., the number of combs per unit area, the thickness of the comb walls, and the specific material of the plastic reinforcement. The density of combs (number of combs per unit area) is dependent upon the desired stiffness, crush characteristics, and materials employed. In some embodiments, the density can be 1 to 20 combs per 100 mm$^2$, specifically, 1 to 10 combs per 100 mm$^2$, and more specifically 1 to 5 combs per 100 mm$^2$. In various embodiments, the thickness of the walls of the plastic reinforcement can be 0.5 mm to 10 mm, specifically, 2 mm to 5 mm, and more specifically 2.5 mm to 4 mm.

The length of the metal component is dependent upon the particular area of the BIW, while the length of the plastic reinforcement is dependent upon the amount and location of enhanced structural integrity in the metal component. The plastic reinforcement can have a length commensurate with the length of the metal component or less than the length of the metal component (e.g., can be localized; i.e., disposed only in a specific location to attain enhanced structural integrity of that location). Desirably, to maximize the weight reduction, the plastic reinforcement is localized so as to add the minimum amount of weight needed to attain a desired structural integrity (e.g., a structural integrity that this greater than or equal to the standard metal component without the thinner walls). In some embodiments, the plastic reinforcement has a length of less than or equal to 1,000 mm, specifically, less than or equal to 800 mm, and more specifically, less than or equal to 300 mm. In various embodiments, the length of the plastic reinforcement can be less than or equal to 80% of the length of the metal component, specifically, less than or equal to 60%, more specifically, less than or equal to 50%, and yet more specifically, 10% to 35% of the length of the metal component (i.e., the metal component that is reinforced by the plastic reinforcement). For example, in some embodiments the plastic reinforcement has a length of 150 mm to 350 mm, specifically, 200 mm to 250 mm, such as for use in a pillar or rail. In other embodiments, the plastic reinforcement has a length of 500 mm to 800 mm, specifically, 600 mm to 700 mm, such as for use in a floor rocker.

As noted above, the plastic reinforcement can be located in various areas of the vehicle, such as in the bumper beam(s) and/or the BIW (such as rail(s), pillar(s), chassis, floor rocker, and cross-bar(s)), as well as combinations comprising at least one of the foregoing. The desired specific location of the reinforcement in the metal component can be determined using crash results. For example, referring to FIG. 10, it can be seen that reinforcement is desired in the B-pillar (e.g., near the center of the B-pillar) and/or in the floor rocker where it meets the B-Pillar. (See exemplary reinforcement locations 70 in FIG. 9)

A more complete understanding of the components, processes, and apparatuses disclosed herein can be obtained by reference to the accompanying drawings. These FIGs. (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
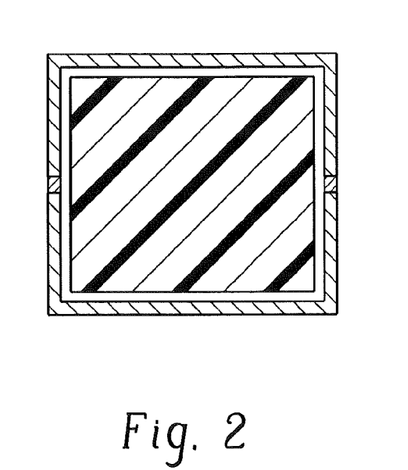
Figure 3:
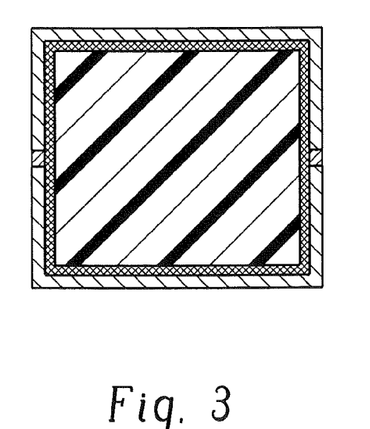
Figure 4:
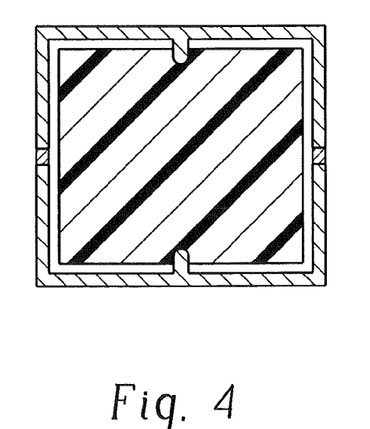

FIGS. 1-4 are cross-sectional examples of a plastic reinforced structural component. As illustrated, the component can be welded (FIGS. 1-4), comprise a standard wall thickness (FIG. 1), comprise thinner walls (FIGS. 2-4), comprise an adhesive to retain the plastic reinforcement in the component (FIG. 3), and/or comprise a fixing measure (FIG. 4). The fixing measures can be mechanical and/or chemical. Exemplary mechanical fixing measures include locking element(s) (such as plastic (e.g., plastic extruded through an opening in the wall connecting the plastic reinforcement to the outside surface of the BIW component)), snaps, hooks, screws, bolts, rivets, welds, crimp(s) (e.g., the crimped metal wall), metal protrusions from the metal component wall to and/or into the plastic reinforcement (such as tabs or the like extending from the wall(s) into the channel to engage the plastic reinforcement), and the like. A friction fit can also be used to maintain the reinforcement in place. Chemical fixing measures can include bonding agents such as glues, adhesives, and so forth. For example, the plastic component can be co-molded into the metal component such that some plastic passes into an opening through the metal wall and solidifies, bonding the components together. In another embodiment, the plastic reinforcement can be inserted into the metal reinforcement in a direction that allows the metal tabs to cantilever outward and spring back into place to engage the plastic reinforcement, inhibiting the removal thereof. Optionally, the plastic reinforcement can comprise an engagement area (e.g., divot, indentation, hole, or the like) configured to engage the tab and further inhibit the separation of the metal component and plastic reinforcement. In some embodiments, the metal component can have a decreased size before and/or after the reinforcement such that the reinforcement cannot be moved (e.g., the reinforcement can be inserted into the metal component and the component can be crimped adjacent the reinforcement to inhibit the subsequent removal or movement of the plastic reinforcement).

In these FIGs, the plastic component 4 located within a channel of a metal component 6, wherein the metal component is held together with welds 2. The metal component can be thin 16. FIG. 3 illustrates an adhesive 8 attaching the plastic component 4 to the metal component 6, while FIG. 4 illustrate mechanical fixing measures 10 (e.g., snaps), retaining the plastic and metal components together.

Figure 5:
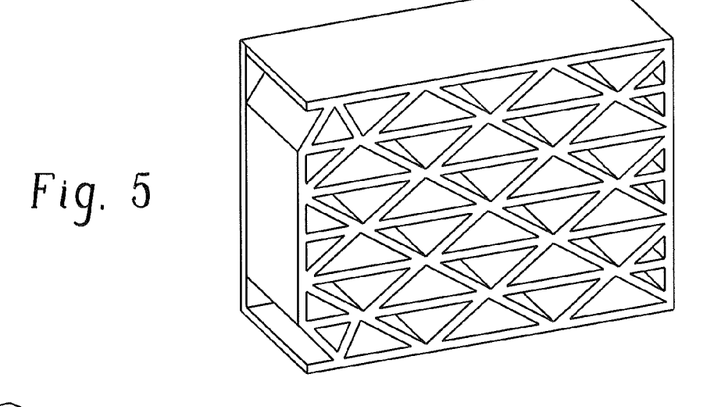
FIGS. 5-7 are perspective views of various exemplary embodiments of plastic reinforcement that can be employed in the BIW.
Figure 6:
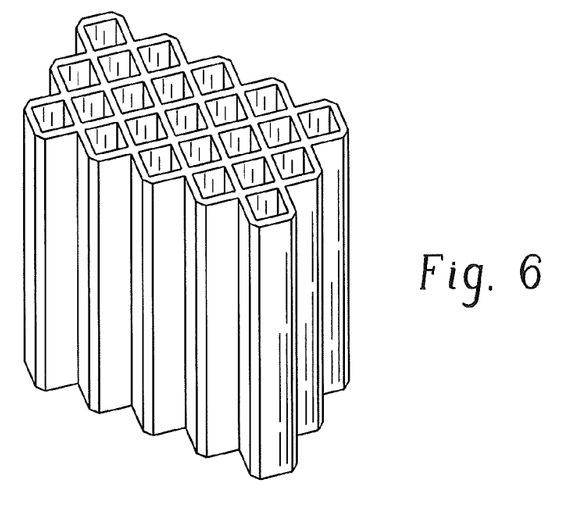
Figure 7:
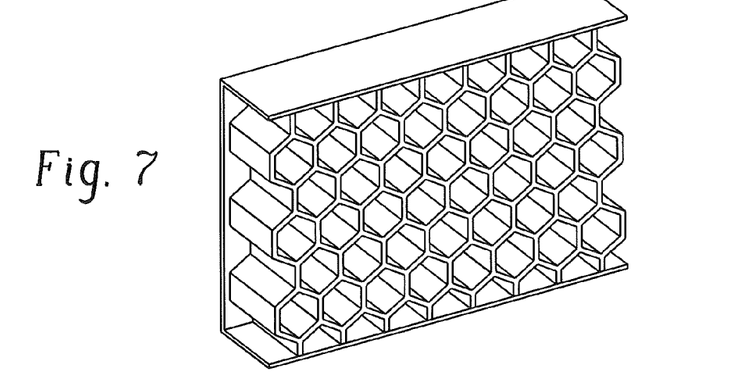

FIGS. 5-7 illustrate exemplary designs of the plastic reinforcement, including some exemplary shapes for the combs thereof. Some exemplary designs for the plastic component include a layered structure comprising a plurality of layers of triangular structures (e.g., layers with diagonal ribs forming triangles; e.g., FIG. 5), rounded comb structures (e.g., circular, oval, and so forth), polygonal comb structures (e.g., a hexagonal comb structure (e.g., FIG. 7), four sided comb structure (e.g., FIG. 6), pentagonal, and so forth), as well as combinations comprising at least one of the foregoing.

Figure 8:
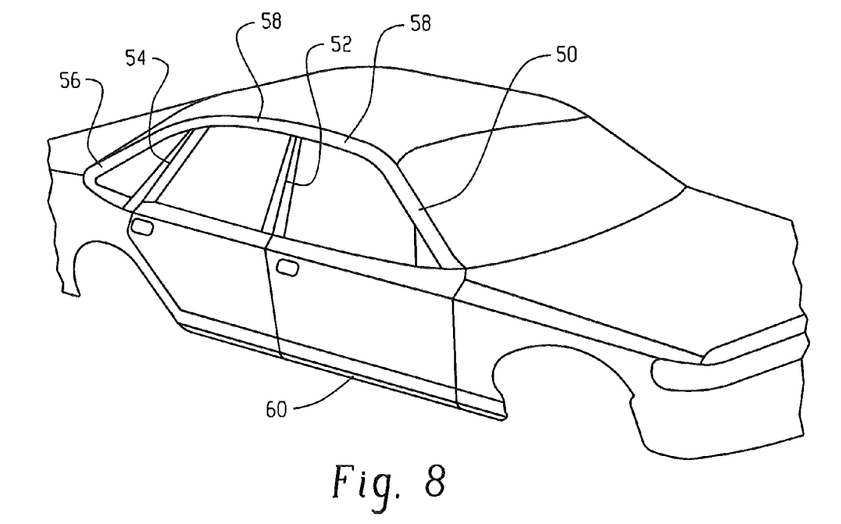
FIG. 8 is a partial perspective view of exemplary areas of the BIW that can be reinforced.

FIG. 8 is a pictorial representation of possible plastic reinforcement locations in a vehicle. Here, the plastic inserts can be located in one or any combination of the identified locations. For example, A-Pillar 50 (e.g., near the center of the length of A-Pillar), B-Pillar 52 (e.g., near the center of the length of B-Pillar), C-Pillar 54 (e.g., near the center of the length of C-Pillar), D-Pillar 56 (e.g., near the center of D-Pillar), roof rail 58 (e.g., in multiple, separate locations along the length of the roof rail; such as centered over the window(s)), and/or floor rocker 60 (e.g., in the area where the B-Pillar meets the floor rocker). For example, inserts that occupy about 10% to 30% of the length of the metal component can be located in A-Pillar 50, B-Pillar 52, the roof rail 58, and the floor rocker 60. The cross-section details shown in FIG. 2 illustrate that two steel channels can be welded together to form a hollow component of the "body in white" with a plastic insert placed in the hollow space. The right location of these plastic inserts depends on crash worthiness performance for different high-speed impact requirements. As is clear from the illustrations (e.g., FIGS. 5-7), the honeycombs form channels. The channels can be oriented parallel to the main axis of the hollow space formed in the body in white component, orienting the channels perpendicular to the main axis of the hollow space formed in the body in white component provides further structural integrity. (See FIGS. 11, 13, and 15)

Figure 9:
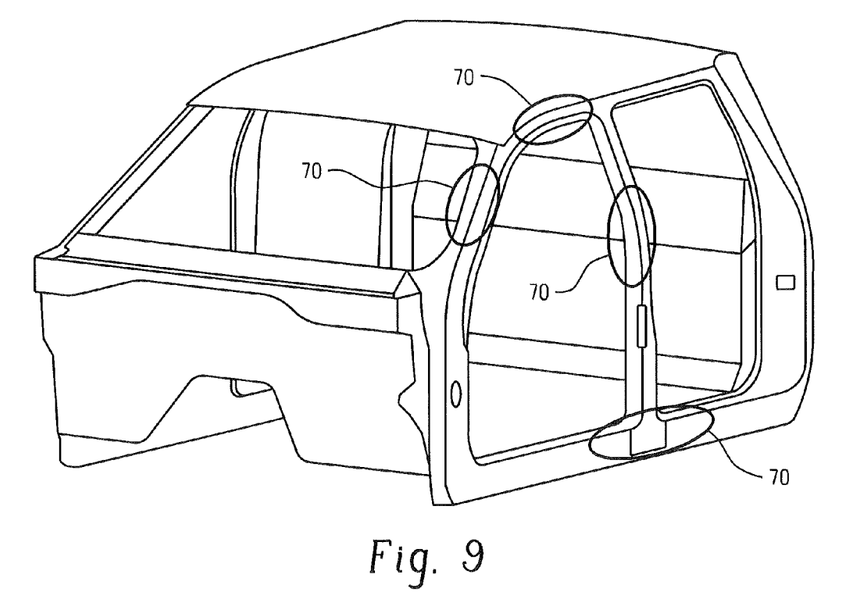
FIG. 9 is a pictorial representation of exemplary locations for the plastic reinforcement.
Figure 10:
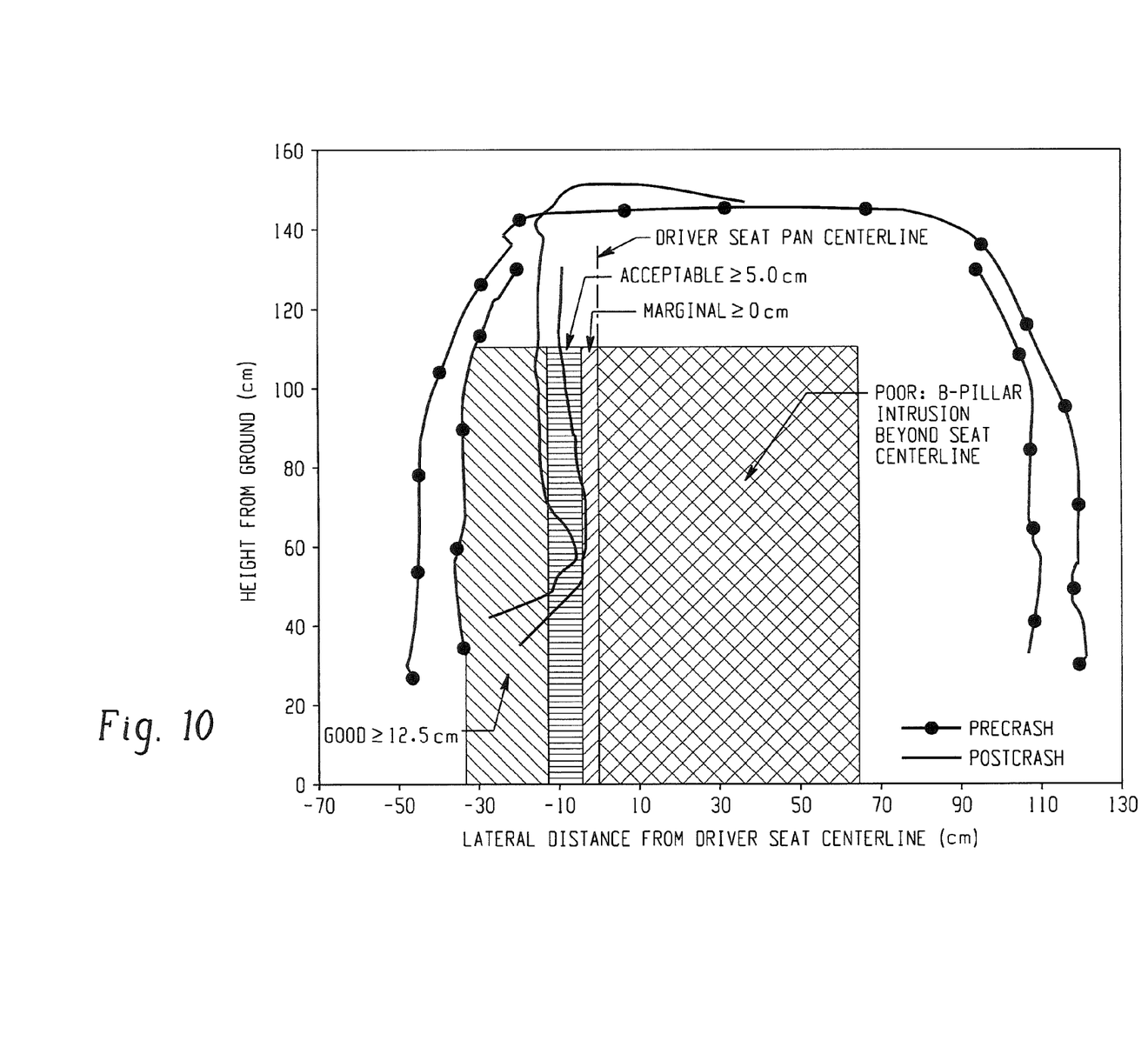
FIG. 10 is a graphical representation of crash result requirements for a BIW.

FIG. 9 is a pictorial representation of concept; in which localized plastic inserts are proposed at identified locations of A-Pillar, B-Pillar, roof rail, and floor rocker and so forth. The cross-section details shown in FIG. 9 that two steel channels are welded together to from hollow component of 'body in white' and a plastic insert is placed in above-mentioned hollow space. The right location of these plastic inserts depends on crashworthiness performance for different high-speed impact requirements.

In some embodiments, the plastic reinforcement can be co-molded with the metal component and located in the cavity. This can be achieved by standard insert molding process.

The energy absorbing assembly is further illustrated by the following non-limiting examples. It is noted that all of the examples were simulations.

EXAMPLES

Example 1

Impact Performance: High-Speed Side Crash
FMVSS 214 Test Performance

A generic full vehicle model is considered for the evaluation of vehicle crashworthiness for high-speed side crash FMVSS 214 test protocols. A flat barrier impact with a speed of 54 kmph and pole impact at a speed of 32 kmph as per the FMVSS214 test protocol have been studied. The vehicle model includes all the BIW components (A-Pillar, B-Pillar, C-Pillar, D-Pillar, front rails, chassis ladder, roof crossbar, floor crossbar, roof rail, and floor rocker), body panels, tires, and suspension components, and equivalent mass has been added for other components like interior components of the vehicle. All of these components were considered to be made of steel with a thickness of 0.7 millimeters (mm) to 2.0 mm. The high-speed side crash performance of this vehicle model is compared with the vehicle model having plastic honeycomb reinforcement in the BIW components.

Figure 11:
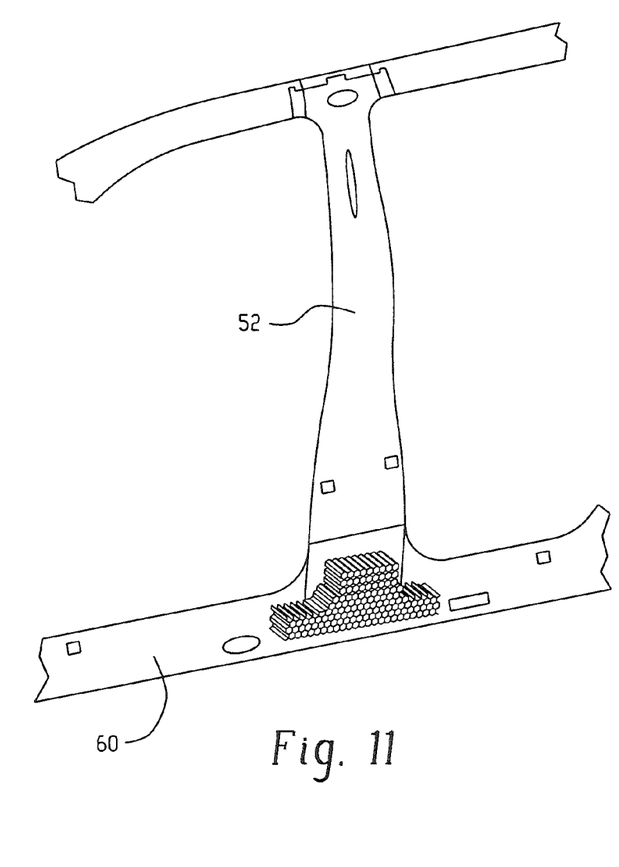
FIG. 11 is a perspective, schematic view of an embodiment of a honeycomb insert in the junction of B-pillar and the floor rocker.
Figure 12:
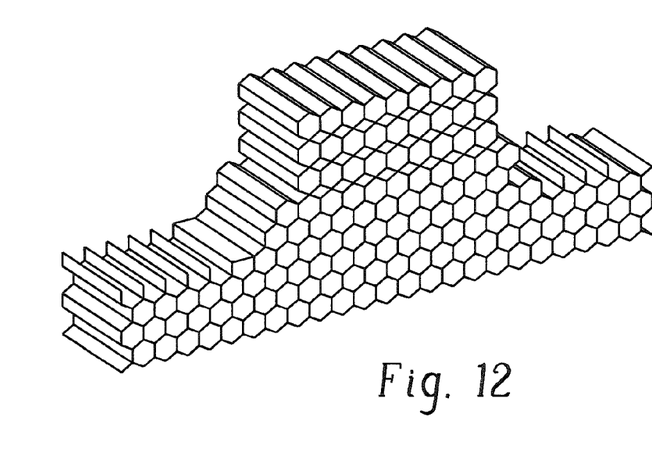
FIG. 12 is a perspective, exploded view of the honeycomb insert of FIG. 11.
Figure 13:
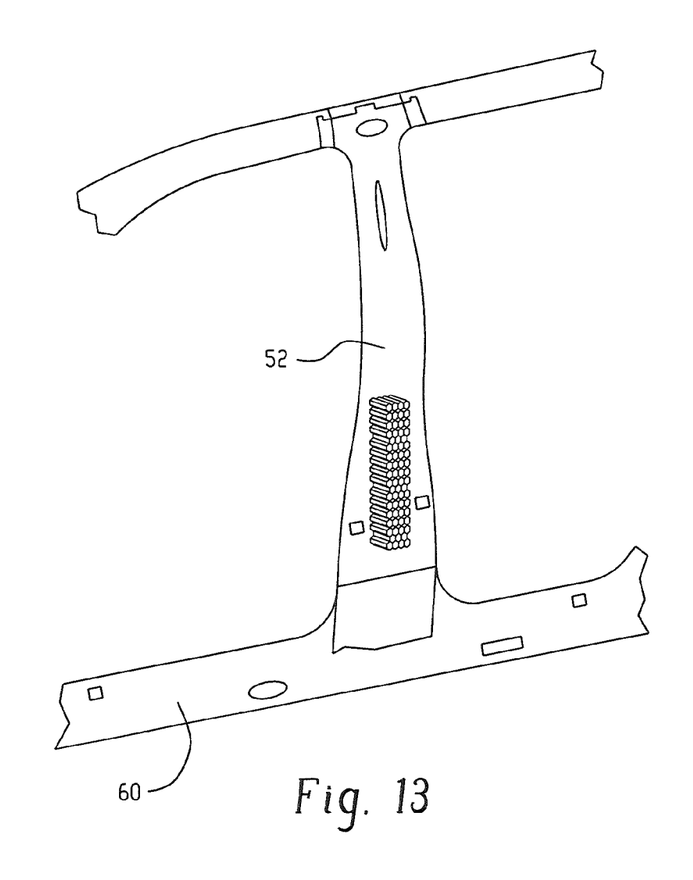
FIG. 13 is a perspective, schematic view of an embodiment of a honeycomb insert in B-pillar.
Figure 14:
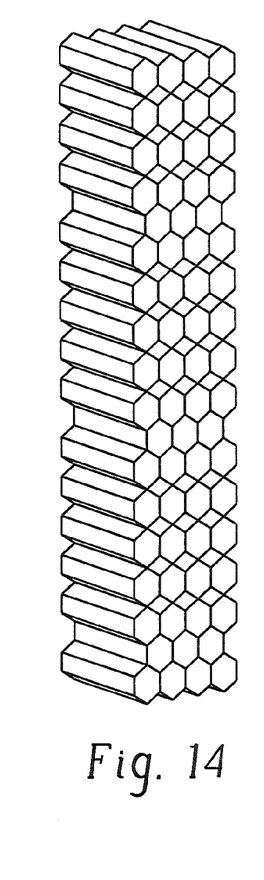
FIG. 14 is a perspective, exploded view of the honeycomb insert of FIG. 13.
Figure 15:
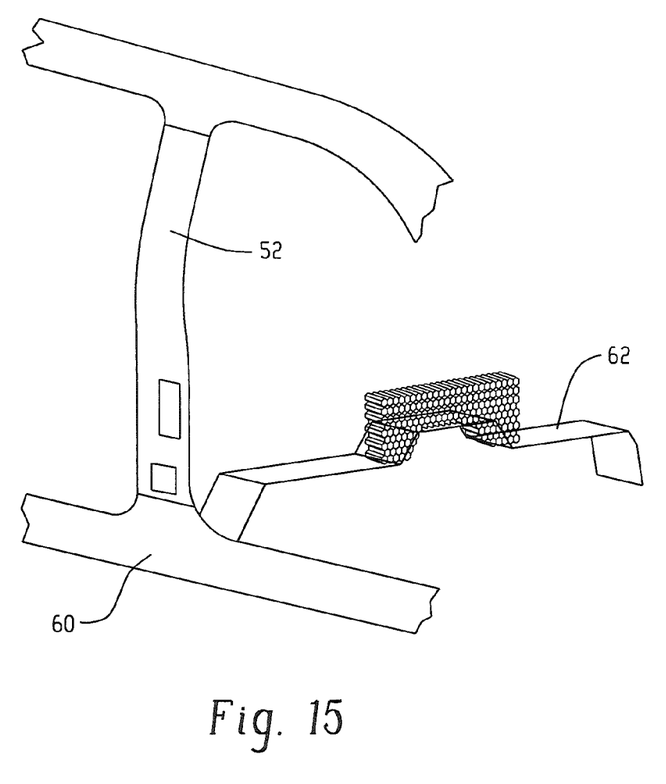
FIG. 15 is a perspective, schematic view of an embodiment of a honeycomb insert in the floor crossbar.
Figure 16:
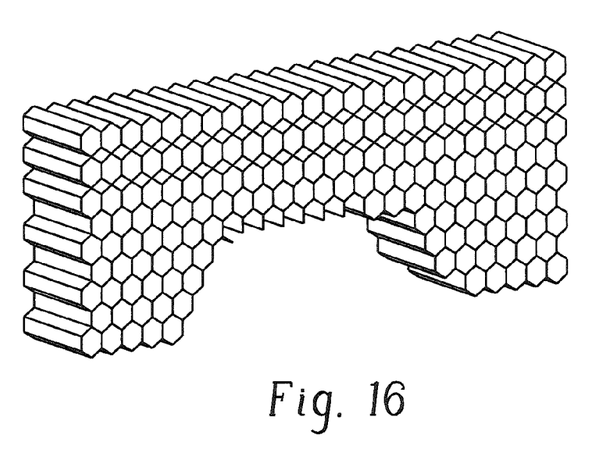
FIG. 16 is a perspective, exploded view of the honeycomb insert of FIG. 15.

For side crashes, floor rocker, B-pillar, and floor crossbar play a key role in energy absorption. Hexagonal honeycombs made of material Noryl GTX* resin (a polyamide and modified polyphenylene ether polymer commercially available from SABIC Innovative Plastics, Pittsfield, Mass.), with thickness of 2.4 mm, have been incorporated at the junction of B-pillar 52 and the floor rocker 60 as shown in FIG. 11, at the B-pillar 52 as shown in FIG. 13, and at the floor crossbar 62 as shown in FIG. 15. FIGS. 12, 14 and 16 illustrate the plastic insert configuration placed into the locations identified in FIGS. 11, 13 and 15, respectively.

The size of the honeycomb inserts varies with respect to the packaging available within the steel channels. The insert (FIG. 12) at floor rocker is designed for and about 70 mm depth and covers about 400 mm×200 mm area at the T-junction of B-pillar 52 and the floor rocker 60 (FIG. 11). The honeycomb insert (FIG. 14) in the B-pillar is designed for about 60 mm depth and covers an area of 60 mm×350 mm of B-pillar (FIG. 13). The honeycomb insert (FIG. 16) for floor cross bar 62 is designed for 80 mm depth and covers about 500 mm×90 mm area of the floor crossbar (FIG. 15). Different cases of combination of these honeycomb inserts have been studied as mentioned below.

TABLE 1

| | |
|---|---|
| Case 1 | No plastic reinforcement to BIW parts |
| Case 2 | Plastic honeycomb reinforced at Junction of floor rocker and B-pillar |
| Case 3 | Plastic honeycomb reinforced at Junction of floor rocker and B-pillar, and at B-pillar |
| Case 3 | Plastic honeycomb reinforced at Junction of floor rocker and B-pillar, at B-pillar and at the floor crossbar |

During the high-speed side crash the B-pillar may intrude into the driver causing injury. Thus, deformation of B-pillar is a key parameter to evaluate the vehicle crashworthiness. Remaining space between the B-pillar and centre line of the driver seat determines the safety (see FIG. 10). The B-pillar deformation for flat barrier hit and pole impact have been captured in Table 2.

TABLE 2

| | | | Case 1 | Case 2 | Case 3 | Case 4 |
|---|---|---|---|---|---|---|
| High speed side Crash test (FMVSS 214) | Flat Barrier impact (54 kmph) | Maximum deformation of B-Pillar (mm) | 145 | 130 | 124 | 113 |
| | Pole Impact (32 kmph) | Maximum deformation of B-Pillar (mm) | 166 | 134 | 128 | 118 |

From the above-mentioned studies, 15% to 30% improvement in the performance of vehicle BIW, with plastic honeycomb reinforcement at different locations, compared to no plastic reinforcement is observed for high-speed side crashes.

To retain the same structural integrity (crash performance) during high-speed side crashes, the plastic reinforcement to BIW may help in greater than or equal to 10% reduction in weight of BIW compared to designs without plastic reinforcement, due to a reduction in the steel gauge (thickness) at different locations.

As can be seen from the test data, the use of localized plastic reinforcement (e.g., plastic honeycomb structure having hollow channels therethrough) enables the reduction in wall thickness of the reinforced component by greater than or equal to 15%, while retaining the structural integrity.

With foam filled components, a hollow part is filled with foam to its full volume, and the expanded foam material provides the connection to the wall and thus the absorption of force and distribution of load. The reinforcement characteristics are based on the material properties of the foam. However, foam reinforcement systems require a chemical reaction that must be adapted to the production process of the vehicle, particularly in terms of the incident temperatures. The reinforcement function thus depends on accurate and constant adherence to the process parameters. Another disadvantage is that the structural parts can no longer be disconnected from one another easily, making recycling more difficult. In addition, completely filling the space with foam brings about a more or less homogeneous reinforcement effect, without the ability to take three-dimensional varying design requirements into account.

In crush countermeasure systems that include steel stampings fixed to sheet metal via thermoset adhesive, the adhesive will activate and expand as the body goes through the ovens that bake the paint. Therefore, this system is not optimal. The stampings are heavy and excessive adhesive would generally need to be applied to assure a solid bond from the countermeasure to the body.

By uniting the structural component (e.g., any hollow, metal, load bearing component in the vehicle) and plastic reinforcements as described herein, several advantages are realized: (i) the design is lighter compared to all metallic components, yet the same structural requirements are still met, (ii) the plastic reinforcements have a high stiffness by weight ratio compared to other reinforcements (e.g., compared to foam, expandable epoxy, and steel reinforcements), (iii) there is better thermal performance during paint cycle compared to foam or epoxy reinforcement solutions, and/or (iv) no changes are required in existing assembly line; e.g., the crush countermeasure can be manufactured and used in a motor vehicle without the use of additional processing steps. In addition, since the same structural integrity can be attained at a reduced weight, or better structural integrity can be attained at the same weight of standard, all steel structural components (e.g., BIW), this design is better suited to meet the carbon dioxide emission requirements due to be in effect by 2016, as well as meeting the safety requirements of the National Highway Traffic Safety Administration (NHTSA).

In one embodiment, a structural body of a vehicle comprises: a hollow metal vehicle component comprising walls that define a channel, wherein the metal vehicle component has a metal component length, and wherein the metal vehicle component is selected from the group consisting of beam, rail, pillar, chassis, floor rocker, and cross-bar, combinations comprising at least one of the foregoing; and a plastic reinforcement having a honeycomb structure, wherein the plastic reinforcement is located in the channel. The metal component can be a portion of the structural body of the vehicle.

In one embodiment, a vehicle comprises: structural body, an engine; and a drive mechanism. The structural body comprises: a hollow metal vehicle component comprising walls that define a channel, wherein the metal vehicle component has a metal component length, and wherein the metal vehicle component is selected from the group consisting of beam, rail, pillar, chassis, floor rocker, and cross-bar, combinations comprising at least one of the foregoing; and a plastic reinforcement having a honeycomb structure, wherein the plastic reinforcement is located in the channel.

In the various embodiments: (i) the honeycombs are filled; and/or (ii) the plastic reinforcement comprises a thermoplastic; and/or (iii) the plastic reinforcement further comprises fiber reinforced thermoplastic; and/or (iv) the plastic reinforcement has a plastic reinforcement length that is less than or equal to 80% of the metal component length; and/or (v) the plastic reinforcement length is 10% to 35% of the metal component length; and/or (vi) the plastic reinforcement has a hollow honeycomb structure with a hexagonal comb geometry, and has a length of 150 mm to 350 mm; and/or (vii) the plastic reinforcement has a hollow honeycomb structure with a hexagonal comb geometry, and has a length of 500 mm to 800 mm; and/or (viii) the plastic reinforcement is attached to the metal vehicle component with mechanical fixing measures; and/or (ix) the metal vehicle component is a floor rocker; and/or (x) the metal vehicle component is a bumper beam; and/or (xi) the metal vehicle component has a space having a major axis, and wherein the honeycomb structure comprises channels, and wherein the channels are oriented perpendicular to the major axis; and/or (xii) the metal vehicle component has a space having a major axis, and wherein the honeycomb structure comprises channels, and wherein the channels are oriented perpendicular to the major axis.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A structural body of a vehicle, comprising:
   a hollow metal vehicle component comprising walls that define a channel having a major axis, wherein the metal vehicle component has a metal component length, and wherein the metal vehicle component is selected from the group consisting of rail, pillar, chassis, floor rocker, and cross-bar, combinations comprising at least one of the foregoing; and
   a plastic reinforcement having a honeycomb structure, wherein the plastic reinforcement is located in the channel.

2. The structural body of claim 1, wherein the honeycombs are filled.

3. The structural body of claim 1, wherein the plastic reinforcement comprises a thermoplastic reinforcement.

4. The structural body of claim 1, wherein the plastic reinforcement further comprises fiber reinforced thermoplastic reinforcement.

5. The structural body of claim 1, wherein the plastic reinforcement has a plastic reinforcement length that is less than or equal to 80% of the metal component length.

6. The structural body of claim 1, wherein the plastic reinforcement length is 10% to 35% of the metal component length.

7. The structural body of claim 1, wherein the plastic reinforcement has a hollow honeycomb structure with a hexagonal comb geometry, and has a length of 150 mm to 350 mm.

8. The structural body of claim 1, wherein the plastic reinforcement has a hollow honeycomb structure with a hexagonal comb geometry, and has a length of 500 mm to 800 mm.

9. A structural body of a vehicle, comprising:
   a hollow metal vehicle component comprising walls that define a channel, wherein the metal vehicle component has a metal component length, and wherein the metal vehicle component is selected from the group consisting of bumper beam, rail, pillar, chassis, floor rocker, and cross-bar, combinations comprising at least one of the foregoing;
   a plastic reinforcement having a honeycomb structure, wherein the plastic reinforcement is located in the channel; and
   wherein the plastic reinforcement is attached to the metal vehicle component with mechanical fixing measures.

10. The structural body of claim 1, wherein the metal vehicle component is a floor rocker.

11. The structural body of claim 1, wherein the honeycomb structure comprises channels, and wherein the channels are oriented perpendicular to the major axis.

12. A vehicle, comprising:
    a structural body comprising:
    a hollow metal vehicle component comprising walls that define a channel having a major axis, wherein the metal vehicle component has a metal component length, and wherein the metal vehicle component is selected from the group consisting of rail, pillar, chassis, floor rocker, and cross-bar, combinations comprising at least one of the foregoing; and a plastic reinforcement having a honeycomb structure, wherein the plastic reinforcement is located in the channel;

an engine; and a drive mechanism.

13. The vehicle of claim 12, wherein the honeycomb structure comprises channels, and wherein the honeycomb channels are oriented perpendicular to the major axis.

14. The structural body of claim 1, wherein the channel walls have a varying gauge along the major axis.

15. The vehicle of claim 12, wherein the channel walls have a varying gauge along the major axis.

16. The structural body of claim 1, wherein the plastic reinforcement has Young's modulus of 0.8 to 7.0 GPa.

17. The vehicle claim 12, wherein the plastic reinforcement has Young's modulus of 0.8 to 7.0 GPa.

18. A structural body of a vehicle, comprising:

a hollow metal vehicle component comprising walls that define a component channel having a major axis, wherein the metal vehicle component has a metal component length, and wherein the metal vehicle component is selected from the group consisting of bumper beam, rail, pillar, chassis, floor rocker, and cross-bar, combinations comprising at least one of the foregoing; and a plastic reinforcement having a honeycomb structure, wherein the plastic reinforcement is located in the component channel, wherein the honeycomb structure comprises honeycomb channels that are oriented perpendicular or parallel to the major axis.

19. The structural body of claim 18, wherein the honeycomb channels are oriented perpendicular to the major axis.

20. The structural body of claim 18, wherein the walls have a varying gauge along the major axis.

21. The structural body of claim 20, wherein the gauge of the channel wall is thinner at the location of the plastic reinforcement.

22. The vehicle claim 12, wherein the gauge of the channel wall is thinner at the location of the plastic reinforcement.

* * * * *